(12) United States Patent
Sethre

(10) Patent No.: US 9,638,366 B2
(45) Date of Patent: May 2, 2017

(54) COUPLER DEVICE AND A METHOD OF PREVENTING SPILLAGE FROM A COUPLER DEVICE

(75) Inventor: Kåre Sethre, Posgrunn (NO)

(73) Assignee: MacGregor Norway AS, Kristiansand (NO)

( * ) Notice: Subject to any disclaimer, the term of this patent is extended or adjusted under 35 U.S.C. 154(b) by 0 days.

(21) Appl. No.: 13/704,853

(22) PCT Filed: Jun. 15, 2011

(86) PCT No.: PCT/NO2011/000173
§ 371 (c)(1),
(2), (4) Date: Mar. 1, 2013

(87) PCT Pub. No.: WO2011/159168
PCT Pub. Date: Dec. 22, 2011

(65) Prior Publication Data
US 2013/0146146 A1    Jun. 13, 2013

(30) Foreign Application Priority Data

Jun. 17, 2010 (NO) .................. 20100873

(51) Int. Cl.
*B08B 3/00* (2006.01)
*F16L 37/00* (2006.01)
(Continued)

(52) U.S. Cl.
CPC .............. *F16L 37/00* (2013.01); *B63B 27/25* (2013.01); *F16L 37/36* (2013.01); *Y10T 137/0318* (2015.04); *Y10T 137/9029* (2015.04)

(58) Field of Classification Search
CPC . F16L 37/36; F16L 37/00; F16L 37/18; Y10T 137/9029; Y10T 137/0318;
(Continued)

(56) References Cited

U.S. PATENT DOCUMENTS 2,031,151 A  *  2/1936 Eulberg .................... 137/240
3,473,569 A     10/1969 Guertin et al.
(Continued)

FOREIGN PATENT DOCUMENTS

CN      1037954 A   12/1989
EP      0251091 A2   7/1988
(Continued)

OTHER PUBLICATIONS

International Search Report issued in PCT/NO2011/000173 mailed Oct. 28, 2011 (2 pages).
(Continued)

*Primary Examiner* — Craig J Price
(74) *Attorney, Agent, or Firm* — Osha Liang LLP

(57) ABSTRACT

A coupling device for use on ends of loading arms for coupling to loading adapters on transportation vehicles, the coupling device including a first coupler member having a first valve, a second coupler member having a second valve, first and second members arranged and configured to displace at least a portion of fluid from a plurality of mating regions between the first and second coupler members, and a volume defined between the first and second coupler members having an inlet conduit and an outlet conduit, the inlet and outlet conduits connected to an external fluid control and integrated in the first coupler member.

10 Claims, 5 Drawing Sheets

(51) Int. Cl.
*B63B 27/25* (2006.01)
*F16L 37/36* (2006.01)

(58) Field of Classification Search
CPC ........... Y10T 137/0424; Y10T 137/043; Y10T 137/4259; Y10T 137/4358; Y10T 137/87957; B63B 27/25
USPC .............. 137/15.05, 15.06, 240, 246, 614.04
See application file for complete search history.

(56) References Cited

U.S. PATENT DOCUMENTS

| | | | |
|---|---|---|---|
| 3,583,426 A * | 6/1971 | Feres | 137/240 |
| 3,605,789 A * | 9/1971 | Graham | 137/240 |
| 4,030,524 A * | 6/1977 | McMath et al. | 137/614.06 |
| 4,522,223 A | 6/1985 | Balsys et al. | |
| 7,628,171 B2 | 12/2009 | Watanabe | |
| 2005/0022883 A1 | 2/2005 | Adams et al. | |
| 2009/0001720 A1 | 1/2009 | Cheon et al. | |
| 2011/0214748 A1* | 9/2011 | Sebben | 137/15.06 |

FOREIGN PATENT DOCUMENTS

| | | |
|---|---|---|
| GB | 1218941 A | 1/1971 |
| JP | 4-73488 A | 3/1992 |
| JP | 11-300292 A | 11/1999 |
| WO | 93/06407 A1 | 4/1993 |

OTHER PUBLICATIONS

International Preliminary Report on Patentability issued in PCT/NO2011/000173 mailed Sep. 19, 2012 (6 pages).
Norwegian Search Report issued in Norwegian U.S. Pat. No. 20100873 dated Jan. 14, 2011 (1 page).
Response to Written Opinion dated May 23, 2012 in PCT/NO2011/000173 filed Jul. 19, 2012 (5 pages).
Patent Abstracts of Japan, Publication No. JP4073488 dated Mar. 9, 1992 (2 pages).
Patent Abstracts of Japan, Publication No. 11300292 dated Nov. 2, 1999 (1 page).
Office Action in corresponding Chinese Patent Application No. 201180029185.3 mailed Mar. 18, 2014 (13 pages).

* cited by examiner

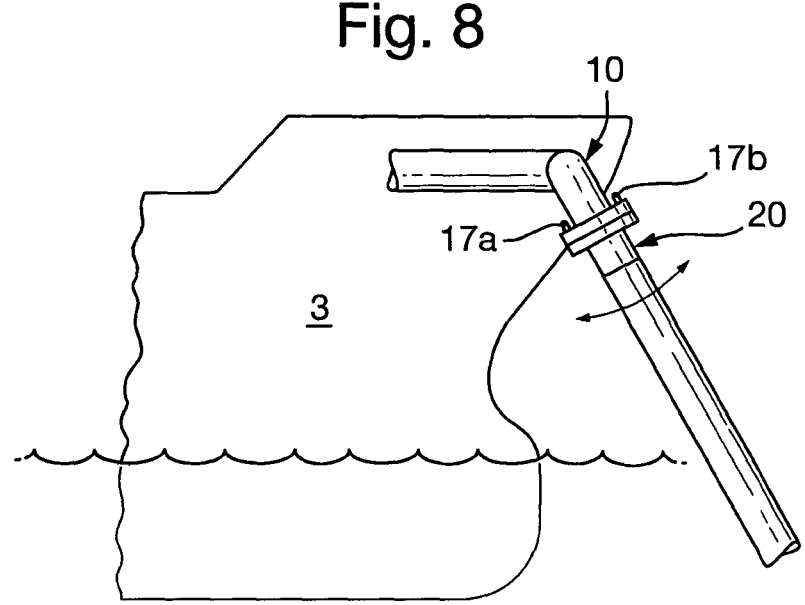
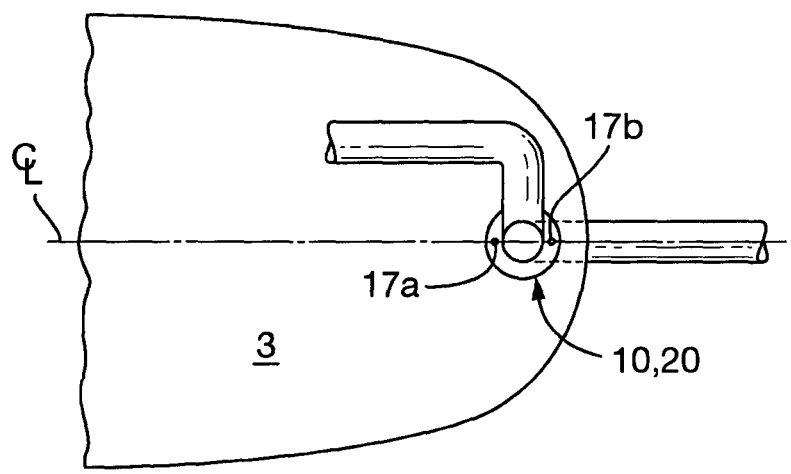

COUPLER DEVICE AND A METHOD OF PREVENTING SPILLAGE FROM A COUPLER DEVICE

FIELD OF THE INVENTION

The invention relates to couplers. More specifically, the invention concerns a coupling device for use in a fluid system comprising a first coupler member having a first valve means and a second coupler member having a second valve means, and a method of controlling a residual fluid confined by adjacent surfaces of first and second coupler members of a coupling device.

BACKGROUND OF THE INVENTION

Dry-break couplers are commonly used to provide for quick coupling and decoupling of fluid conduits. A dry-break coupler generally comprises a pair of disconnectably connectable coupling members, each having a poppet valve by means of which fluid flow may be controlled. When the coupling members are connected together, the poppet valves may be opened, thus forming a flow passage for the transfer of fluids, primarily liquids, through the coupler. One such coupler is described in U.S. Pat. No. 3,473,569.

The operation of a prior art dry-break coupler is illustrated in FIGS. 1a-1c. A coupler valve comprises a first coupling member 10 and a second coupling member 20, each comprising respective housings 19, 29 and having respective poppet valves 14, 24. The first coupling member 10, which may be connected to a ship (not shown), is connectable to the second coupling member 20, which may be connected to a hose (not shown) via a clamp arrangement 12, in a manner which is known in the art.

FIG. 1a shows the two coupling halves in a disconnected and closed state, i.e. where the poppet valves prevent flow through the respective coupling housing. FIG. 1b shows the dry-break coupler in a connected and open state, i.e. where the poppet valves 14, 24 have been activated (in a manner known in the art via i.a. the spring 21), thus allowing a flow F (of e.g. oil or an oil/gas mixture) from the hose, through the coupler and into the ship. FIG. 1c shows the coupler in a connected and closed state, i.e. where the poppet valves have been closed, thus preventing fluid flow through the housings. The state illustrated by FIG. 1c is representative of the state immediately before disconnection of the two couplers.

Present dry-break couplers are constructed in such a manner that spillage of fluids upon coupling and/or decoupling of the coupling members is reduced to a minimum. However, a problem with prior art dry-break couplers is that even such devices have a tendency to lose an, albeit small, quantity of fluid during uncoupling. In particular, large couplers (in the oil and gas industry, commonly 20" diameter) are designed with a certain tolerance, leaving an effective volume between the mating surfaces in which liquids and/or gases will accumulate when the poppet valves close prior to coupler disconnection. This is illustrated by FIG. 2, identifying the mating region M1 of the two coupling housings 19, 29 and the mating region M2 of the two poppet valves 14, 24, and showing the coupler in a connected and closed configuration (cf. FIG. 1c), and the resulting volume 2 in the mating regions M1, M2 where residual fluids will accumulate when the poppet valves are closed but before the couplers members are disconnected. Reference number 11 denotes a coupler seal. Where such coupling devices are used in fluid systems containing fluids which are of a dangerous nature or in pristine environments, spillage of such residual fluid contained by the volume 2 is particularly undesirable, even though it may be a comparably small volume.

In the hydrocarbon transport industry, dry-break couplers have been used on the ends of loading arms for coupling to loading adapters on transportation vehicles such as tank trucks and ships. For example, large couplers for transferring oil and/or gas between ships and offshore production plants or onshore plants are used extensively world-wide. Dry-break couplers are normally arranged more or less horizontally and above a deck structure or similar, whereby the residual fluids in the volume 2 may be collected by a drip tray, or similar, when the couplers are disconnected.

However, offshore loading and dynamic positioning now require couplers which are movable, suspended from the ship and hanging (e.g. by cardanic suspension) above the water surface (with no intermediate structure onto which a drip tray may be placed). These couplers are connected and disconnected in a vertical—or near vertical—position, above the sea.

It is therefore a need for a device and a method for reducing spillage of residual fluids upon disconnecting a coupler.

The present applicant has devised and embodied this invention to overcome the shortcomings of the prior art, and to obtain further advantages.

SUMMARY OF THE INVENTION

The invention is set forth and characterized in the main claims, while the dependent claims describe other characteristics of the invention.

It is thus provided a coupling device for use in a fluid system comprising a first coupler member having a first valve means and a second coupler member having a second valve means, said coupling members being configured to cooperate with each other to provide a coupling device, each of the coupler members having means for connection to a fluid system and means for fastening the two members to each other; and said valve means being configured to cooperate with each other and to control fluid flow through their respective coupler member; characterized by fluid displacement means arranged and configured for displacing at least a portion of fluid from the mating regions between the coupler members.

In one embodiment, fluid displacement means comprise a first element arranged in a first mating region between the coupling members, and a second element arranged in the mating region between the valve means.

In one embodiment, the first and second elements comprise elastic gaskets. The first and second elements may also comprise an absorbent material.

In one embodiment, the first element attached to a housing of the first coupling member and the second element is attached to the first valve means.

In one embodiment, the fluid displacement means comprise at least one inlet conduit and at least one outlet conduit between a volume defined between the coupler members and external fluid supply and control means.

In one embodiment, the conduits are integrated in the first coupler member and arranged at opposite sides of the volume.

When the coupling is suspended from a vessel, the conduits are preferably arranged along the ship's longitudinal axis and the coupling is arranged to rotate in the ship's vertical plane.

In one embodiment, the volume comprises an annular volume. In one embodiment, the means for retaining and/or removing said residual fluid portion are attached to or associated with the first coupling member.

It is also provided a method of controlling a residual fluid confined by mating regions between adjacent surfaces of first and second coupler members of a coupling device, characterized by injecting a cleaning fluid into a volume between the coupler members through a first conduit at a pressure which is sufficient to discharge the residual fluid from the volume through a second conduit, whereby spillage of the absorbed residual fluid is at least substantially prevented when the coupler members are disconnected from each other.

The purpose of the invention is to avoid or substantially reduce spillage of harmful residual fluids which have accumulated between the coupling members and which otherwise would have been released into the environment when the coupler is disconnected, by absorbing and/or removing such fluids before the coupler is disconnected.

The coupler according to the invention is particular useful when applied to comparably large couplers, which are designed with a certain tolerance, leaving an effective volume between the mating surfaces in which fluids will accumulate when the poppet valves are closed prior to coupler disconnection.

BRIEF DESCRIPTION OF THE DRAWINGS

These and other characteristics of the invention will be clear from the following description of preferential forms of embodiments, given as non-restrictive examples, with reference to the attached drawings wherein:

FIG. 8 is a schematic illustration, in side view, of the coupler according to the invention assembled on a ship; and FIG. 9 is a schematic illustration, in top view, of the coupler according to the invention assembled on a ship.

DETAILED DESCRIPTION OF PREFERENTIAL EMBODIMENTS

Figure 1A:
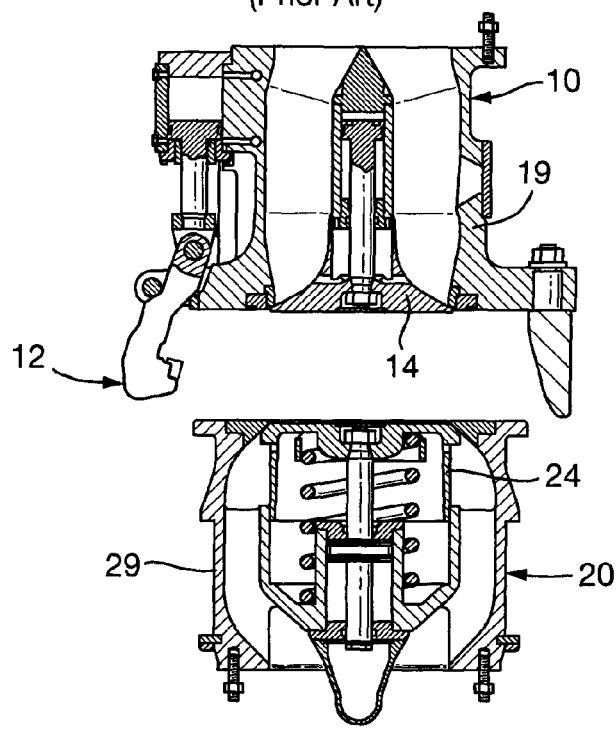
FIG. 1a is a sectional drawing of a prior art coupler, comprising a coupler valve and a hose valve, in a disconnected and closed state.
Figure 1B:
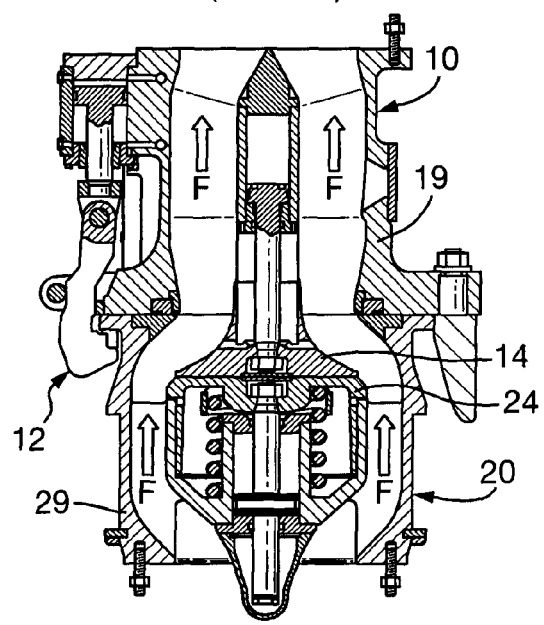
FIG. 1b shows the prior art coupler of FIG. 1a in a connected and open state, allowing fluid from through the coupler.
Figure 1C:
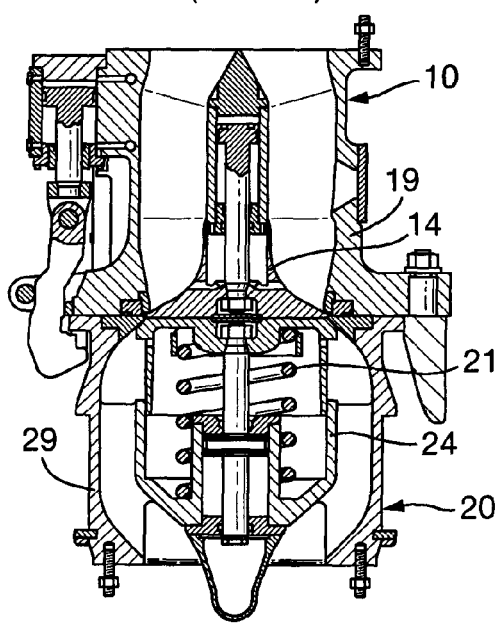
FIG. 1c shows the prior art coupler of FIG. 1a in a connected and closed state, preventing fluid flow through the coupler.
Figure 2:
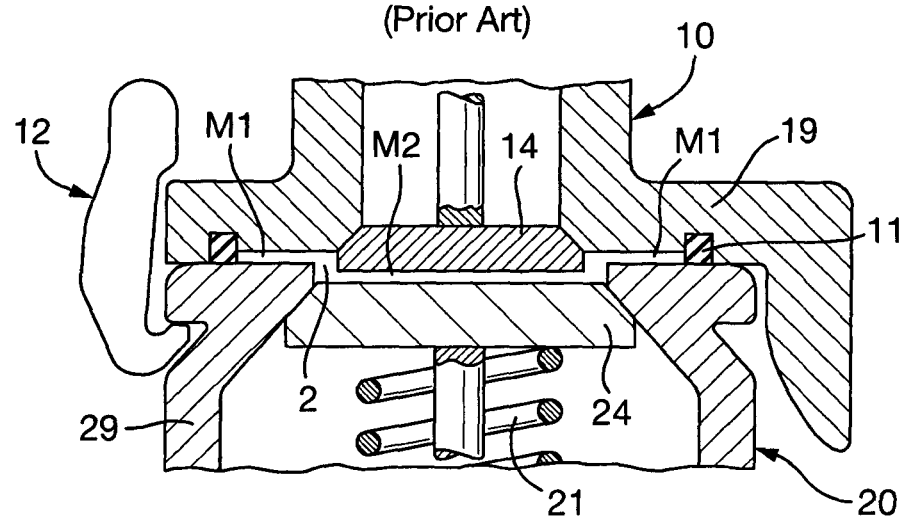
FIG. 2 is a schematic drawing showing an enlarged portion of the prior art coupler illustrated in FIG. 1c.
Figure 3:
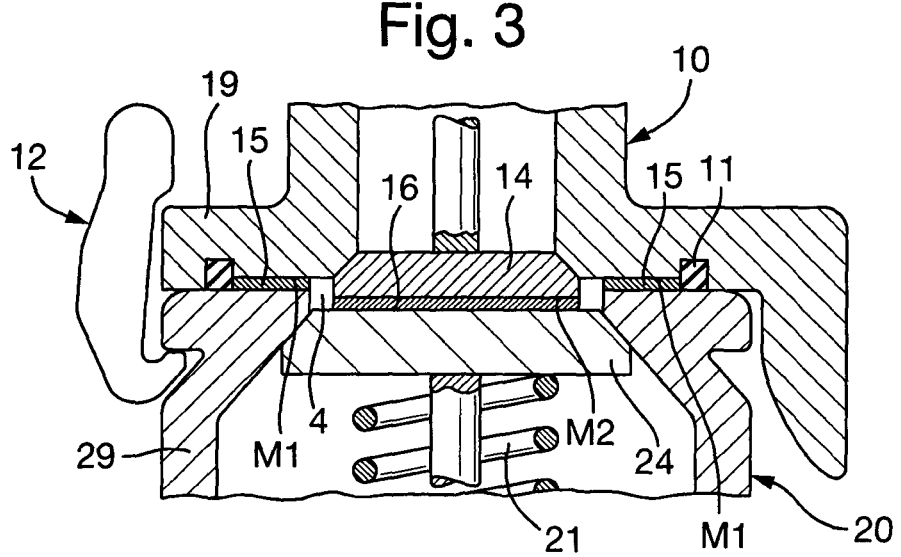
FIG. 3 is a schematic drawing of a first embodiment of the invention, showing the coupler in a connected and closed state.

FIG. 3 shows a first embodiment of the coupler according to the invention in a connected and closed state (i.e. comparable to the state of the prior art coupler illustrated in FIGS. 1c and 2). The coupler according to the invention comprises a first coupler member 10 and a second coupler member 20, interconnected via known connection means (schematically illustrated by coupler clamp 12). The first coupler member is connected to a ship or similar vessel (not shown in FIG. 3) and the second coupler member 20 is connected to a hose (not shown in FIG. 3) which in turn may be connected to an oil storage facility.

A coupler seal 11 provides a seal between the mating surfaces of the coupler members, which is known in the art.

The coupler according to the invention comprises a first element 15 which is disposed in the mating region M1, i.e. between the adjacent surfaces of the coupling housings 19, 29. The first element 15 does in the illustrated embodiment have the shape of a ring and is delimited in the sideways directions by the coupler seal 11 and an annular volume 4.

A second element 16 is disposed in the mating region M2, i.e. between the adjacent surfaces of the poppet valves 14, 24. The second element 16 does in the illustrated embodiment have a disk shape, covering the entire poppet valve face.

The annular volume 4 in which residual fluids may accumulate is thereby—due to the fluid-displacing elements 15, 16—considerably reduced, compared to that of the prior art (reference number 2 in FIG. 2).

The first and second elements 15, 16 constitute displacement bodies that will displace fluids from between the valve surfaces. The first and second elements may be elastic gaskets, made from a suitable elastic closed-cell sealant material, such as rubber. The elements may also comprise a liquid-absorbent material.

Figure 4:
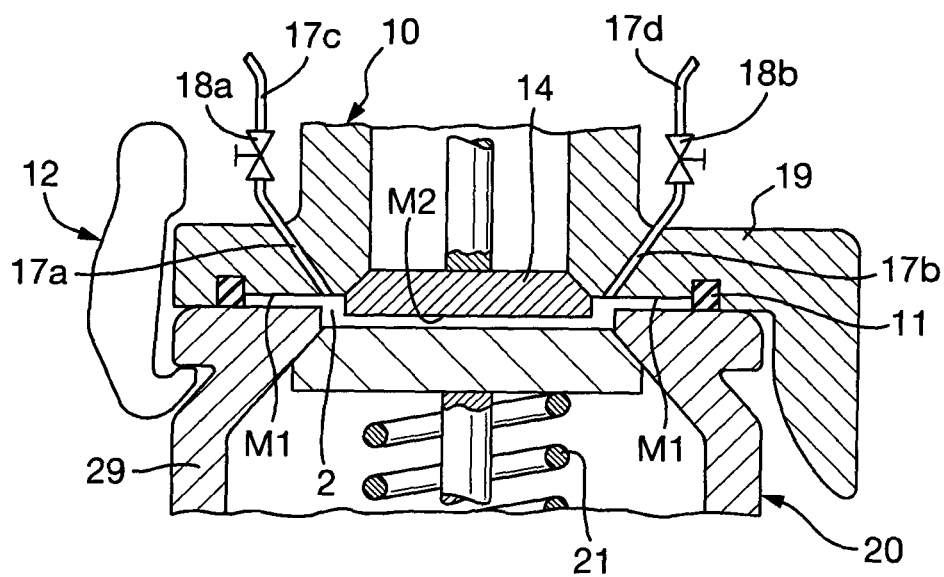
FIG. 4 is a schematic drawing of a second embodiment of the invention, showing the coupler in a connected and closed state.

FIG. 4 shows a second embodiment of the coupler according to the invention in a connected and closed state (i.e. the same state as illustrated by FIG. 3).

In this second embodiment, the coupler according to the invention comprises a first conduit 17a and a second conduit 17b arranged in the first coupling housing 19. The first and second conduits are integral with the coupling housing 19. Each conduit 17a,b fluidly connects the volume 2 defined by the coupling members (see FIG. 4) to a fluid reservoir and control system (not shown), e.g. on board the ship from which the first coupling member 10 is suspended. Respective valves 18a,b control the flow through the volume 2. Reference numbers 17c, 17d denote first and second fluid lines, respectively, which are connected to fluid reservoirs and/or flushing systems (not shown).

Thus, by manipulating the valves 18a,b, any residual fluids within the volume 2 may be drained and/or flushed away from the volume before the coupling members are disconnected.

Figure 5:
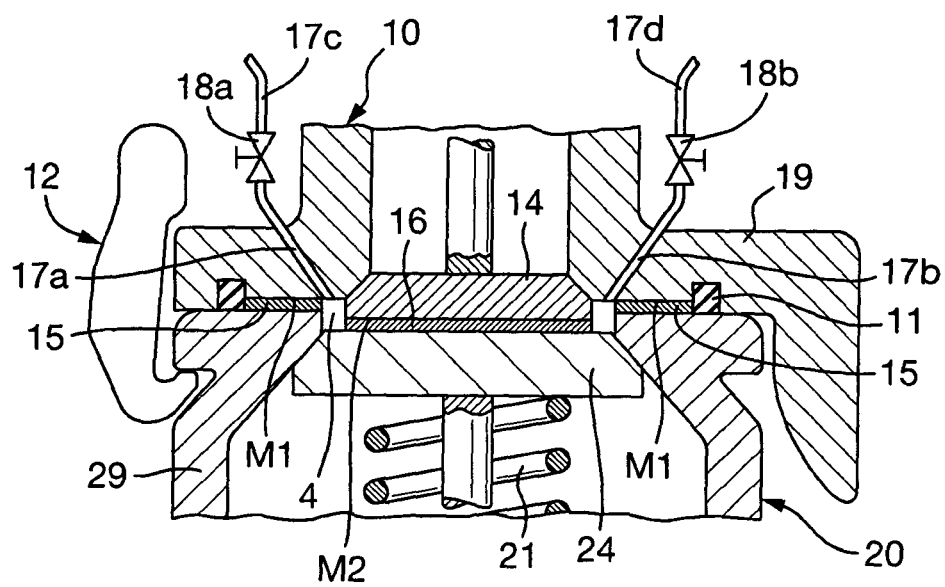
FIG. 5 is a schematic drawing of a third embodiment of the invention, showing the coupler in a connected and closed state.

FIG. 5 shows a third embodiment, which in fact is a combination of the first and second embodiments, in a connected and closed state (i.e. the same state as illustrated by FIGS. 3 and 4).

The coupler according to the invention comprises in this third embodiment a first coupler member 10 and a second coupler member 20, interconnected via known connection means (schematically illustrated by coupler clamp 12). The first coupler member is connected to a ship or similar vessel (not shown in FIG. 5) and the second coupler member 20 is connected to a hose (not shown in FIG. 5) which in turn may be connected to an oil storage facility.

A coupler seal 11 provides a seal between the mating surfaces of the coupler members, which is known in the art.

The coupler comprises in this embodiment a first element 15 which is disposed in the mating region M1, i.e. between the adjacent surfaces of the coupling housings 19, 29. The first element 15 does in the illustrated embodiment have the shape of a ring and is delimited in the sideways directions by the coupler seal 11 and the annular volume 4.

A second element 16 is disposed in the mating region M2, i.e. between adjacent surfaces of the poppet valves 14, 24. The second element 16 does in the illustrated embodiment have a disk shape, as in the first embodiment described above.

The annular volume 4 in which residual fluids may accumulate is thereby—due to the fluid-displacing elements 15, 16—considerably reduced, compared to that of the prior art (reference number 2 in FIG. 2). Also, the annular volume 4 is well defined and provides for better flow conditions than that of the prior art.

The first and second elements 15, 16 constitute displacement bodies that will displace fluids from between the valve surfaces an may comprise materials as described above with reference to the first embodiment.

The coupler further comprises a first conduit 17a and a second conduit 17b arranged in the first coupling housing 19. Each conduit 17a,b fluidly connects the annular volume 4 defined by the coupling members (see FIG. 5) to a fluid reservoir and control system (not shown), e.g. on board the ship from which the first coupling member 10 is suspended. Respective valves 18a,b control the flow through the volume 4. Reference numbers 17c, 17d denote first and second fluid lines, respectively, which are connected to fluid reservoirs and/or flushing systems (not shown).

Figure 6:
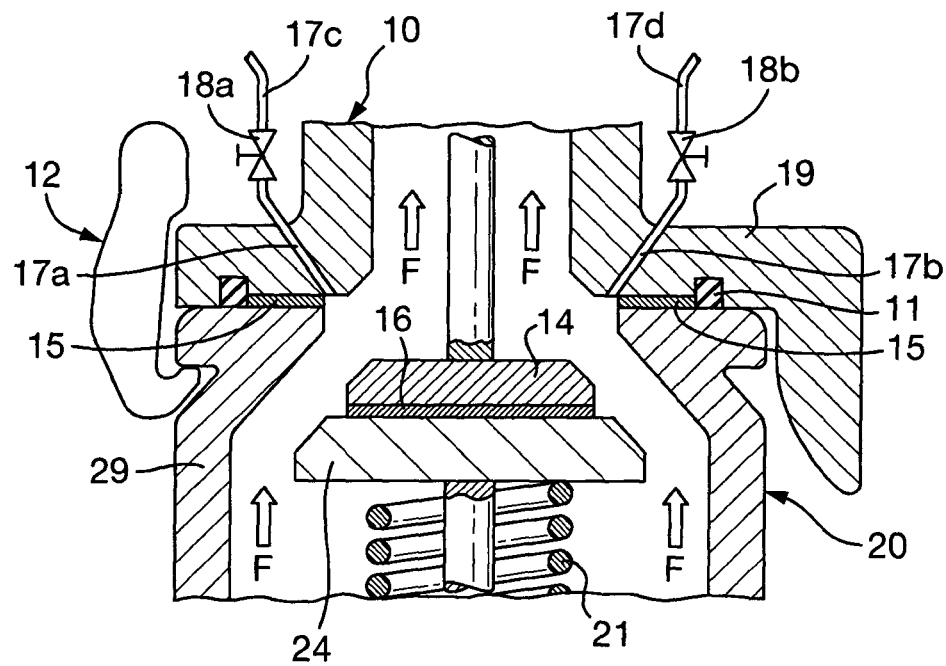
FIG. 6 is a schematic drawing of the third embodiment of the invention, showing the coupler in a connected and open state.

FIG. 6 shows the third embodiment of the coupler according to the invention in a connected and open state (comparable to the state of the prior art coupler shown in FIG. 1b). The coupling housings 19, 29 are connected, and the first element 15 is disposed between the adjacent faces of the coupling housings. The poppet valves 14, 15 are open, and the second element 16 is disposed between adjacent faces of the poppet valves. In this state of the coupler, fluid flow F through the coupler is permitted, and the flushing/draining valves 18a,b are closed.

Figure 7:
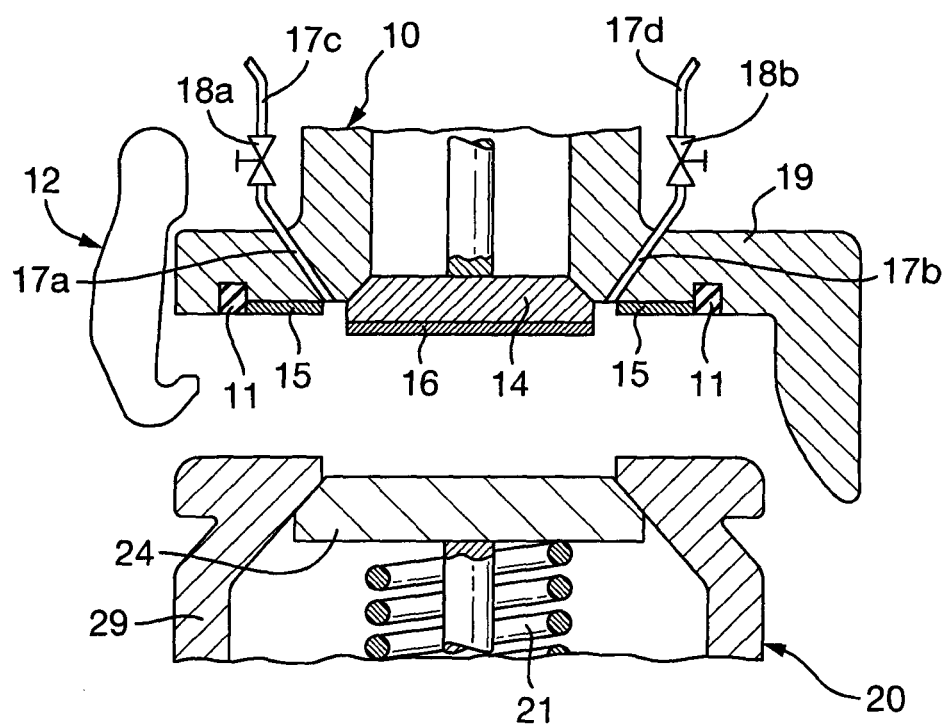
FIG. 7 is a schematic drawing of the third embodiment of the invention, showing the coupler in a disconnected and closed state.

FIG. 7 shows the third embodiment of the coupler according to the invention in a disconnected and closed state (comparable to the state of the prior art coupler shown in FIG. 1a), and illustrates how the first and second elements 15, 16 are attached to the first coupling member 10, i.e. the coupling member which is suspended from the ship.

Referring now to FIG. 8 and FIG. 9, the coupler according to the invention may be suspended from a ship 3 or similar vessel (e.g. the stern). The suspension means may be a cardanic suspension or other suspensions means which is generally known in the art. The coupler is thus arranged to pivot, as indicated by the double arrow in FIG. 8. The coupler is arranged such that the first and second conduits 17a,b are arranged substantially coincident with the ship's 3 longitudinal axis such and move in the ship's 3 vertical place, as indicated by the dotted line CL in FIG. 9. In this manner, the first conduit 17a is at a lower position than the second conduit 17b, which is illustrated in FIG. 8, or vice versa. Therefore, when the coupler is in use, a "high" conduit and a "low" conduit may always be defined, which aids the evacuation of the residual fluids (e.g. liquid oil) in the volume 4.

The residual fluids (e.g. oil and/or gas) in the coupler according to the invention, when the poppet valves are closed but while the coupler is still connected (cf. FIG. 5) may therefore be controlled by the combined effects of the elements 15, 16 and the conduits 17a,b and associated valves 18a,b.

For example, referring to FIGS. 5 and 8, a non-toxic cleaning liquid or gas may be injected into the annular volume 4 via the second conduit 17b, whereby the residual fluid in the annular volume is ejected through the first conduit 17a. In the event that the annular volume 4 comprises gases, a cleaning fluid may be injected into the first conduit 17a, whereby the gas is displaced from the volume via the second conduit 17b. In another mode of operation, the coupler is lifted to a near horizontal state, whereby residual liquids will gravitate out of the annular volume via the first conduit 17a. In all of these cases, the residual fluids and the cleaning fluids are conveyed to a slop tank (not shown) on the ship, for further cleaning and treatment.

With the invention, any residual liquids of gases within the annular volume 4 may be drained and/or flushed away before the coupling members 10, 20 are disconnected, thereby avoiding or substantially reducing spillage of unwanted liquids into the sea and gases into the atmosphere when the coupler members are separated from each other.

The invention claimed is:

1. A coupling device comprising:
    a first coupler member connected to a ship, the first coupler member having a first valve;
    a second coupler member connected to a hose, the second coupler member having a second valve;
    a fluid displacement body that comprises:
        a ring-shaped first elastic gasket arranged in a first mating region between adjacent surfaces of the first and second coupler members, and
        a disk-shaped second elastic gasket arranged in a second mating region between adjacent surfaces of the first and second valves when the coupling device is in a closed state, the fluid displacement body arranged and configured to displace at least a portion of fluid from the first and second mating regions; and
    a volume defined between the ring-shaped first elastic gasket and the disk-shaped second elastic gasket and between the first and second coupler members, the ring-shaped first elastic gasket is delimited in a sideway direction by a coupler seal and disposed radially outside the disk-shaped second elastic gasket to limit the volume for accumulating residual fluid, the volume having an inlet conduit and an outlet conduit, each of the inlet and outlet conduits connected to an external fluid control and the inlet and outlet conduit being integrated in the first coupler member,
    wherein the first and second coupler members are configured to cooperate with each other,
    wherein each of the first and second coupler members are configured to connect to a fluid system and are configured to releasably fasten to each other,
    wherein the first and second valves are configured to cooperate with each other and are configured to control fluid flow through their respective coupler member, and
    wherein the external fluid control is configured to control drainage of a residual fluid in the volume prior to unfastening the coupler members.

2. The coupling device of claim 1, wherein the ring-shaped first elastic gasket and disk-shaped second elastic gasket comprise an absorbent material.

3. The coupling device of claim 1, wherein the ring-shaped first elastic gasket is attached to a housing of the first coupler member and the disk-shaped second elastic gasket is attached to the first valve.

4. The coupling device of claim 1, wherein the inlet and outlet conduits are arranged at opposite sides of the volume.

5. The coupling device of claim 1 the volume comprises an annular volume.

6. The coupling device of claim 1, wherein the fluid displacement body is attached to, or associated with, the first coupler member.

7. The coupling device of claim 1, wherein the coupling device is a dry-break coupler.

8. The coupling device according the claim 1, wherein the ring-shaped first elastic gasket and/or the disk-shaped second elastic gasket is/are made of rubber.

9. A method of controlling fluid confined by the mating regions between the adjacent first and second coupler members of the coupling device of claim 1, the method comprising:
   suspending the coupling device from a vessel;
   arranging the inlet and outlet conduits along a longitudinal axis of the vessel; and
   arranging the coupling device to rotate in a vertical plane of the vessel to define a high conduit and a low conduit.

10. A method of controlling fluid confined by mating regions between adjacent first and second coupler members of a dry-break coupling device, the method comprising:
   injecting, through a first conduit, a cleaning fluid into a volume defined between a ring-shaped first elastic gasket arranged in a first mating region between adjacent surfaces of the first and second coupler members and a disk-shaped second elastic gasket arranged in a second mating region between adjacent surfaces of the first and second valves when the first and second coupler are in a closed state, the ring-shaped first elastic gasket is delimited in a sideway direction by a coupler seal and disposed radially outside the disk-shaped second elastic gasket to limit the volume for accumulating residual fluid, and defined between the first and second coupler members at a pressure sufficient to discharge residual fluid from the volume through a second conduit, the first and second conduits integrated in the first coupler member;
   draining, by manipulating connected valves, the residual fluid using external fluid control comprising first and second fluid lines in communication with the first and second conduit, respectively, and
   wherein the first coupler member is connected to a ship, and
   wherein the second coupler member is connected to a hose.

* * * * *